United States Patent
Ventura

(10) Patent No.: US 11,132,503 B2
(45) Date of Patent: Sep. 28, 2021

(54) QUERY A SYSTEM VIA NATURAL LANGUAGE NLP2X

(71) Applicant: noHold, Inc., Milpitas, CA (US)

(72) Inventor: Diego Ventura, Milpitas, CA (US)

(73) Assignee: noHold, Inc., Milpitas, CA (US)

( * ) Notice: Subject to any disclaimer, the term of this patent is extended or adjusted under 35 U.S.C. 154(b) by 289 days.

(21) Appl. No.: 16/172,457

(22) Filed: Oct. 26, 2018

(65) Prior Publication Data

US 2019/0130026 A1 May 2, 2019

Related U.S. Application Data

(60) Provisional application No. 62/707,311, filed on Oct. 30, 2017.

(51) Int. Cl.
| | |
|---|---|
| *G06F 16/00* | (2019.01) |
| *G06F 40/20* | (2020.01) |
| *G06F 16/33* | (2019.01) |
| *G06F 16/31* | (2019.01) |
| *G06F 16/338* | (2019.01) |
| *G06F 16/332* | (2019.01) |
| *G06F 40/295* | (2020.01) |

(52) U.S. Cl.
CPC .......... *G06F 40/20* (2020.01); *G06F 16/322* (2019.01); *G06F 16/338* (2019.01); *G06F 16/3329* (2019.01); *G06F 16/3334* (2019.01); *G06F 16/3344* (2019.01); *G06F 40/295* (2020.01)

(58) Field of Classification Search
CPC ............... G06F 16/3344; G06F 16/322; G06F 16/3334; G06F 16/3329; G06F 16/338; G06F 40/295; G06F 40/20
See application file for complete search history.

(56) References Cited

U.S. PATENT DOCUMENTS

| | | | |
|---|---|---|---|
| 6,604,141 B1 | 8/2003 | Ventura | |
| 8,239,362 B1 | 8/2012 | Frazier | |
| 9,223,537 B2* | 12/2015 | Brown | G06F 3/165 |
| 10,417,567 B1* | 9/2019 | Miller | G06N 3/006 |
| 10,546,001 B1* | 1/2020 | Nguyen | G06N 20/00 |
| 2004/0220850 A1* | 11/2004 | Ferrer | G06Q 30/0269 |
| | | | 705/14.66 |
| 2006/0253410 A1 | 11/2006 | Nayak et al. | |
| 2007/0192474 A1 | 8/2007 | Decasper et al. | |
| 2009/0055190 A1 | 2/2009 | Filev et al. | |
| 2009/0216735 A1* | 8/2009 | Dexter | G06F 16/955 |
| 2012/0084293 A1* | 4/2012 | Brown | G06F 16/90335 |
| | | | 707/741 |
| 2012/0221854 A1 | 8/2012 | Orsini et al. | |
| 2014/0136519 A1 | 5/2014 | Latzina et al. | |
| 2015/0019216 A1* | 1/2015 | Singh | G06F 16/24578 |
| | | | 704/235 |

(Continued)

*Primary Examiner* — Jared M Bibbee
(74) *Attorney, Agent, or Firm* — Carr & Ferrell LLP

(57) ABSTRACT

The present technology relates generally to interactive virtual conversation interfaces, and more specifically, a method for querying an interactive virtual conversation interface in natural language, comprising receiving a digital document in a system, connecting to the system having the digital document, creating named entity files within the digital document, initializing operators and intent files, processing an end user query, creating a table query statement, sending the table query statement to the system, and receiving and displaying results.

12 Claims, 5 Drawing Sheets

(56) References Cited

U.S. PATENT DOCUMENTS

| | | | |
|---|---|---|---|
| 2015/0185996 A1* | 7/2015 | Brown | G06F 3/04817 |
| | | | 715/706 |
| 2015/0310005 A1 | 10/2015 | Ryger et al. | |
| 2016/0239487 A1 | 8/2016 | Potharaju et al. | |
| 2017/0116260 A1* | 4/2017 | Chattopadhyay | G06F 16/243 |
| 2017/0242886 A1* | 8/2017 | Jolley | G06F 40/205 |
| 2018/0032576 A1* | 2/2018 | Romero | G06F 16/24522 |
| 2018/0097749 A1 | 4/2018 | Ventura | |
| 2018/0366118 A1* | 12/2018 | Lovitt | G06F 16/90332 |

\* cited by examiner

| Model | Processor | RAM | Screen | Price |
|---|---|---|---|---|
| Armada | I5 | 8GB | 14" | $500 |
| Armada Plus | I5 | 8GB | 17" | $750 |
| Armada G | I5 | 8GB | 18" | $1000 |
| Nexus | I7 | 16GB | 14" | $1500 |
| Solar | I7 | 16GB | 18" | $2000 |

FIG. 2

QUERY A SYSTEM VIA NATURAL LANGUAGE NLP2X

CROSS REFERENCE TO RELATED APPLICATIONS

This application is a non-provisional application that claims the benefit and priority of U.S. Provisional Application Ser. No. 62/707,311, filed Oct. 30, 2017, titled "Query a System via Natural Language NLP2X," which is hereby incorporated by reference in its entirety including all references and appendices cited therein. This application is related to U.S. Non-Provisional application Ser. No. 15/721,545, filed on Sep. 29, 2017, titled "Interactive Virtual Conversation Interface Systems and Methods," which in turn is a non-provisional application that claims the benefit and priority of U.S. Provisional Application Ser. No. 62/496,024, filed on Oct. 3, 2016, all of which are hereby incorporated by reference in their entireties including all references and appendices cited therein.

FIELD OF THE TECHNOLOGY

The present technology relates generally to interactive virtual conversation interfaces.

SUMMARY OF THE PRESENT TECHNOLOGY

The present technology relates generally to interactive virtual conversation interfaces, and more specifically, a method for querying an interactive virtual conversation interface in natural language, comprising receiving a digital document in a system that comprises plain textual information, connecting to the system having the digital document, creating named entity files within the digital document, initializing operators and intent files, processing an end user query, creating a table query statement, sending the table query statement to the system, and receiving and displaying the results.

Further exemplary embodiments include processing the end user query utilizing natural language processing of the digital document to ascertain a hierarchical structure of the plain textual information, determine topics within the plain textual information, generating a tree structure based on relationships between topics of the plain textual information, wherein the topics are arranged into the tree structure, and generating the interactive virtual conversation interface that receives queries and presents responses to the queries using the tree structure. Additionally, a hierarchical structure of the document may be based on a layout of the digital document.

In yet further exemplary embodiments, a query may be received from a user through an interactive virtual conversation interface, parsing the query with the natural language processing to identify query topics, searching the tree structure for digital signatures that correspond to at least a portion of the query topics, generating a response to the query, the response comprising the plain textual information associated with the digital signatures that correspond to at least a portion of the query topics. Furthermore, if the queries are directed to the same topic, but the queries are stated using different expressions, the method further comprises performing syntactic learning so as to return the same digital signature of digital signatures for these queries having different expressions. Additionally, a type of natural language processing may be based on attributes of the digital document. In other exemplary embodiments, the response is generated using third party data obtained from third party data sources, in addition to the digital document.

Also provided herein are exemplary systems for querying an interactive virtual conversation interface in natural language, the system including a processor, a memory for storing executable instructions, and the processor executing the instructions to receive a digital document in a system that comprises plain textual information, connect to the system having the digital document, create named entity files within the digital document, initialize operators and intent files, process an end user query, create a table query statement, send the table query statement to the system, and receive and display the results.

According to various exemplary embodiments, the interactive virtual conversation interface may comprise an avatar. Additionally, a response may be generated using third party data obtained from third party data sources, in addition to the digital document. In yet further exemplary embodiments, the processor further executes the instruction to utilize symbolic natural language processing when the digital document is a structured document.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 2 shows an exemplary table.

DETAILED DESCRIPTION

In some exemplary embodiments, a method for creating an interactive virtual conversational interface such as a virtual assistant automatically using one or more digital documents as a basis for educating and/or training the interface is provided herein. This training effectively allows the interface to be utilized as a tool to generate responses for queries on particular topics. By way of example, the systems and methods herein can ingest one or more technical documents related to a product or service. The documents are processed to create a query structure that allows for topics in the documents to be accessed and served as responses to queries provided to the interface by a user.

It will be understood that a virtual assistant (VA) is a web-based application based on artificial intelligence (AI) that allows end users to ask questions in a natural language and provides answers automatically without human intervention. Example exchanges can include a question and an answer, and other examples can include a dialog where the end user may change the subject, ask clarifying questions, or follow a procedure—just to name a few. Stated otherwise, some embodiments allow for these interfaces to be interactive based on consumption and processing of knowledge extracted from one or more digital documents.

Figure 1:
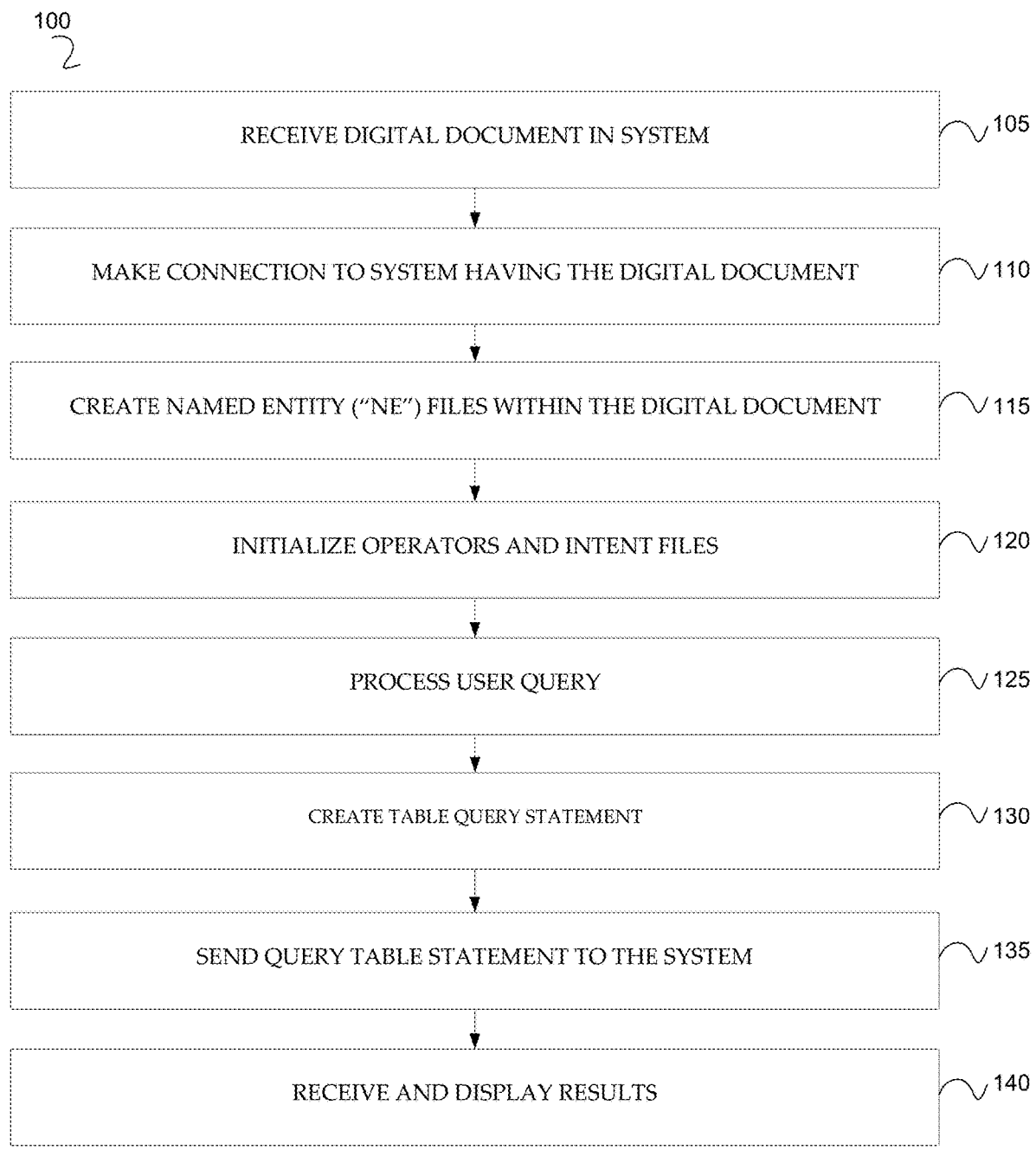
FIG. 1 shows an exemplary method for querying an interactive virtual conversation interface in natural language.

FIG. 1 shows an exemplary method 100 for querying an interactive virtual conversation interface in natural language.

At step 105, a digital document is received in a system. According to exemplary embodiments a system is any data repository where the information is stored in one or multiple tables. Systems may also include databases, spreadsheets, devices, web pages and the like. In some cases, the spreadsheet may be an export of a database.

FIG. 2 shows an exemplary table 200.

Each table is made of rows 205 and columns 210. Typically columns comprise named entities ("NE") (real-world objects, such as persons, locations, organizations, products, etc., that can be denoted with a proper name). Rows 205 are typically associated with specific items. Exemplary table 200 is made of five columns 210 (Models, Processor, RAM, Screen and Price). The "I5" Processor is a NE. The rows 205 comprise Model names, in this case laptops. "Armada" is the name of one of the laptops.

At step 110, a connection is made to the system having the digital document.

The program, according to most exemplary embodiments, connects to the system and identifies the table that will be queried by the end user.

At step 115, named entity files are created within the digital document.

In most exemplary embodiments, the program creates the NE files.

At step 120, operators and intent files are initialized.

Here, according to various exemplary embodiments, the program initializes the operators and intent files.

At step 125, an end user query is processed.

The exemplary methods and systems described herein allow an end user to query the system in the following way via natural language processing:

"Show me computers with I5 and at least 15" screen."
"Show me all computers with I7 processor."
"All with an I5 processor and $1000."
"What about the ones with 17" screens and $2000?"
"Any with 8 GB of RAM?"
"Average the prices of all laptops with an I7 processor."
"Show me all computers with at least an I7 processor and less than 16 GB RAM."
"Show me all computers with at least an I7 processor and less than 16 GB RAM for less than $1000."
"Show me all computers with at least an I7 processor with 16 GB or higher RAM for less than $1000."

In some exemplary embodiments, terms such as "less than" or "more than" may be used.

In some exemplary embodiments, the natural language query is via SQL, which allows interpretation of the database. In other exemplary embodiments, the query could be via something else, including a specific Application Program Interface ("API"). Further exemplary embodiments may include drop-down menus of existing databases, in some cases designed for certain user types, such as residential customers.

At step 130, a table query statement is created.

At step 135, the table query statement is sent to the system.

At step 140, the results are received and displayed.

Figure 3:
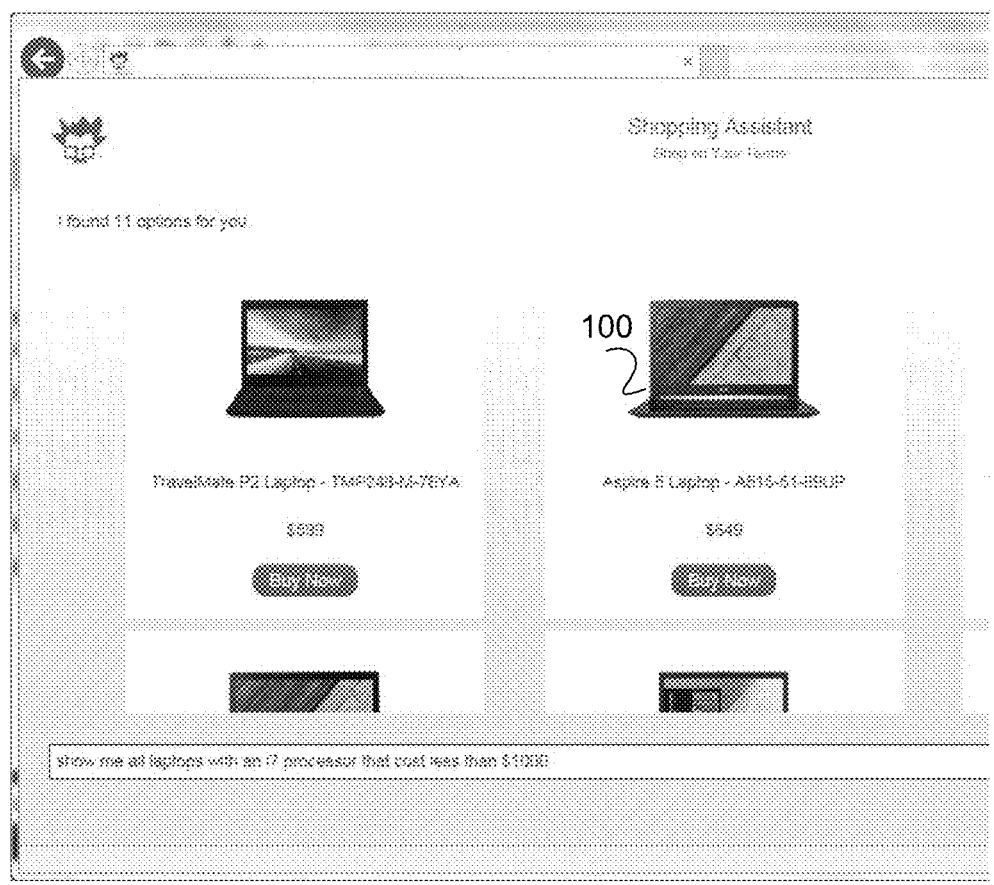
FIG. 3 shows an exemplary screenshot display of certain results

FIG. 3 screenshot 300 shows an exemplary display of certain results. Generally, queries are quite cumbersome, due to the amount of information. Advantageously, through the interactive conversational interface on top of a database, the exemplary systems and methods herein have made the process much easier and less time consuming.

Figure 4:
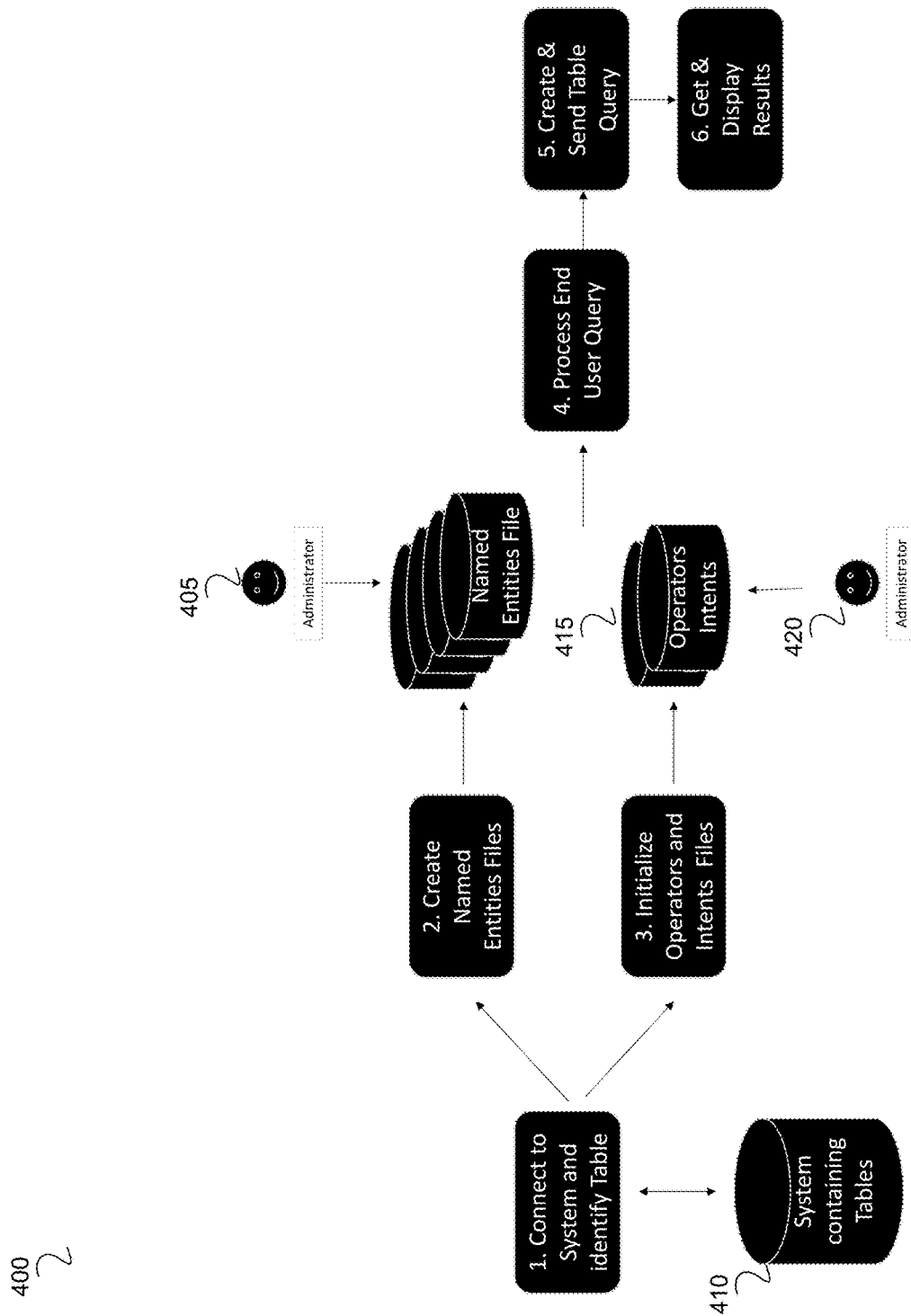
FIG. 4 shows an exemplary system and method.

FIG. 4 shows an exemplary system and method 400.

Shown in FIG. 4 are administrators 405 and 420, system containing tables 410 and operators intents 415.

According to various exemplary embodiments, the process is performed as follows:

1. Connect to the System and Identify a Table.

This process uses parameters from an administrator to connect to a specific table within a system. The methods to connect changes depending on the target. If the table is contained within a spreadsheet, for example, the steps to open it will be different from the one necessary to open a table stored in a remote SQL database.

2. Create Named Entities Files.

This process goes through each column in the table and lists all unique values for each NE contained within the table. Given the laptops in sample table 200, the resulting Named Entities files look something like this:

| Named Entity File (Model) |
| --- |
| Armada |
| Armada G |
| Armada Plus |
| Nexus |
| Solar |

| Named Entity File (Processor) |
| --- |
| I5 |
| I7 |

Optionally, an administrator can manually or programmatically add an additional Named Entity in each file as synonyms of existing one, or as known alternates.

3. Initialize Operators and Intents Files.

A couple of definitions are in order. In the sample query:

"Show me all laptops with an I7 processor that cost less than $1000"

"Show me" is the intent. "Laptops" identifies the table. "I7" is a Named Entity for processor. "Less than" is an operator and "$1000" is a NE for price. The process associated with this task initializes two files, operators and intents. The operators file includes all valid operators that can be associated with the Named Entities in the table. It also initializes the intents file that contains all actions that can be taken on the Named Entities in the table. Examples of intents are: "Show me all . . . ", "Average all . . . ", "Sum prices for all," etc.

4. Process End User Query.

This process is primarily responsible for two tasks:

A. Preprocess the query. This may include spell checking, handling of words morphing and leverage synonyms for the interpretation of the query.

B. Identify Named Entities, Intents and Operators within the query. For example processing the sample query:

"Show me all laptops with an I7 processor that cost less than $1000"

Will return these results:

---
Intent = Show all
Processor = I7
Price = $1000
Operator: less than
---

5. Create Table Query Statement and Send It to the System.

This process is responsible to package the found intent, named entities and operators into a command that can be sent to the system. The specific package format depends on the target system. For example if the target system is a SQL database, then the package will take the form of an SQL string, etc. The packaged query is sent to the system.

6. Receive and Display Results.

This process displays the results received by the system. If the number of items is over a certain threshold, the method displays only the number of items found until the end user confirms that they want them to be actually displayed. Also, end user queries can be concatenated to allow for incremental specificity in the search. For example here is a sample dialog between the End User (EU) and the Virtual Assistant (VA) implemented with the method described here.

A. EU: Find all laptops with an I7 processor
B. VA: I found 372 models
C. EU: display only the one with 16 GB of RAM that cost less than $1000
D. VA: I found 7 of them
E. EU: show them to me In the example above, query "C" is incremental to search "A", meaning that the second search is done on the results of the first search.

Use Cases.

This section describes a few sample use cases for this technology.

Shopping Assistant

In this use case, it is assumed the system to be the Best Buy products database. The method is to connect to the database with the Best Buy Products API. The Shopping Assistant is a Virtual Assistant, which helps end users find what they are looking for quickly. For example customers could ask, "find all refrigerators that are no taller than 7 feet, cost less than $750 and are on sale".

Customer Support

In this use case, we assume the system to be a case management system containing information about customer support inquiries and strategies for problem resolution. The Virtual Assistant can help customer support representatives find more quickly ways in which they can help customers based on past case resolutions. For example, an agent could ask, "show me all cases related to error XYZ for customers who have version 2.3 of our product".

Fraud Detection

In this use case, the target system is a database that holds transactional information and the Virtual Assistant is helping identify patterns typically associated with nefarious activities. For example: "show me all accounts with more than five $2000 transactions in less than 24 hours."

Note that the interaction between the end user and the Virtual Assistant can happen via multiple channels including the web, voice, social media, etc.

EXAMPLE 1

Assume a company has an educational platform. It teaches classes about any particular topic, and the teachers take the steps on the platform to set up a class and have the students do the steps to take the classes. Before long, the company started noticing they had a process where they would give a voucher for every deserving student that was taking a class and getting a good grade. So, they had a voucher system where they would actually give the students some money based on a grade. A great, noble program.

At a second point, the company realized in certain countries some academies had a strange situation. They would see that people would set up a class, and all the students would pass with an A, with everybody completing the test, and the final test, all in five minutes. And the way they knew this is because the online platform had records of all these activities.

The system knew when a class was established, and when students engaged with the class, including how long it took for the students to complete their exams. According the exemplary systems and methods herein, the fraudulent activity was identified. In fact, bad teachers were setting up fake classes with fake students as a fraud to earn money. According to further exemplary embodiments, machine learning may be used. For example, the administrator of the system may use the system to query "show me everything where everybody got an A" and "show me now."

By just doing this, artificial intelligence ("AI") algorithms that may be used to identify every time this pattern takes place.

Figure 5:
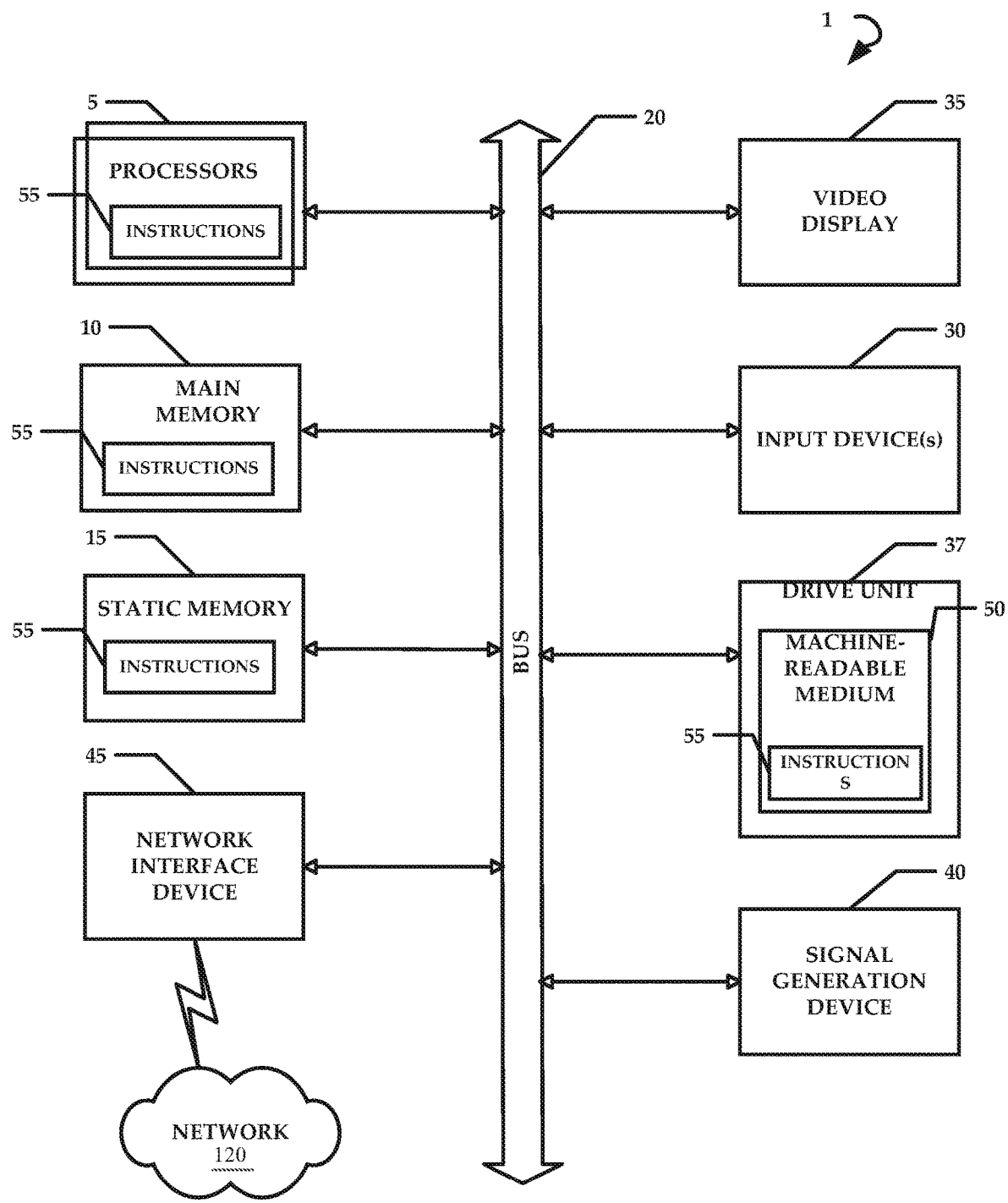
FIG. 5 is a diagrammatic representation of an example machine.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. It could be executed within a Customer Relations Management ("CRM") system. In some cases, the systems and methods herein may comprise sending an API to call Salesforce or the like. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a smart speaker like Echo or Google Home, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network (e.g., network 120) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/ or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for querying an interactive virtual conversation interface in natural language, the method comprising:
    receiving a digital document in a system that comprises plain textual information;
    connecting to the system having the digital document, the digital document comprising a table, the table comprising columns and rows;
    creating named entity files within the digital document comprising listing unique values in the rows of the table for each of the named entity files;
    initializing operators and intent files, the initializing operators comprising valid operators associated with a named entity and the intent files comprising allowed actions for the named entity in the table;
    processing an end user query;
    creating a table query statement;
    sending the table query statement to the system; and
    receiving and displaying results using the table of the digital document.

2. The method of claim 1, further comprising:
    processing the end user query utilizing natural language processing of the digital document to:
        ascertain a hierarchical structure of the plain textual information; and
        determine topics within the plain textual information;
    generating a tree structure based on relationships between the topics of the plain textual information, wherein the topics are arranged into the tree structure; and generating a interactive virtual conversation interface that receives queries and presents responses to the queries using the tree structure.

3. The method according to claim 2, wherein the hierarchical structure of the digital document is based on a layout of the digital document.

4. The method according to claim 2, further comprising:
receiving a query from a user through the interactive virtual conversation interface;
parsing the query with natural language processing to identify query topics;
searching the tree structure for digital signatures that correspond to at least a portion of the query topics; and
generating a response to the query, the response comprising the plain textual information associated with digital signatures that correspond to at least a portion of the query topics.

5. The method according to claim 4, wherein if the queries are directed to the same topic, but the queries are stated using different expressions, the method further comprises performing syntactic learning so as to return the same digital signature of the digital signatures for these queries having different expressions.

6. The method according to claim 1, wherein a type of natural language processing utilized is based on an attribute of the digital document.

7. The method according to claim 4, wherein the response is generated using third party data obtained from third party data sources, in addition to the digital document.

8. A system for querying an interactive virtual conversation interface in natural language, the system comprising:
a processor; and
a memory for storing executable instructions, the processor executing the instructions to:
receive a digital document in a system, the digital document comprising plain textual information;
connect to the system having the digital document, the digital document comprising a table, the table comprising columns and rows;
create named entity files within the digital document comprising listing unique values in the rows of the table for each of the named entity files;
initialize operators and intent files, the initialize operators comprising valid operators associated with a named entity and the intent files comprising allowed actions for the named entity in the table;
process an end user query;
create a table query statement;
send the table query statement to the system; and
receive and display results.

9. The system according to claim 8, wherein if the queries are directed to the same topic, but the queries are stated using different expressions, the processor further executes the instructions to: perform syntactic learning so as to return the same digital signature of digital signatures for these queries having different expressions.

10. The system according to claim 8, wherein a virtual conversation interface comprises an avatar.

11. The system according to claim 8, wherein a response is generated using third party data obtained from third party data sources, in addition to the digital document.

12. The system according to claim 8, wherein the processor further executes the instructions to utilize symbolic natural language processing when the digital document is a structured document.

* * * * *